(12) United States Patent
Berger et al.

(10) Patent No.: US 7,900,072 B2
(45) Date of Patent: Mar. 1, 2011

(54) TRI-LAYERED POWER SCHEME FOR ARCHITECTURES WHICH CONTAIN A MICRO-CONTROLLER

(75) Inventors: Michael Berger, Ramat-Gan (IL); Michael Derr, El Dorado Hills, CA (US); Joshua Resch, Portland, OR (US); Mukesh Kataria, Folsom, CA (US); Mazen Gedeon, Hillsboro, OR (US); Eli Kupermann, Maale Adumim (IL); Jeffrey John Vick, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 675 days.

(21) Appl. No.: 11/963,215

(22) Filed: Dec. 21, 2007

(65) Prior Publication Data

US 2009/0164819 A1      Jun. 25, 2009

(51) Int. Cl.
*G06F 1/00* (2006.01)
*G06F 1/26* (2006.01)
*H04M 1/00* (2006.01)
*G11C 5/14* (2006.01)

(52) U.S. Cl. ......... 713/323; 713/300; 713/320; 713/324; 455/574; 365/227

(58) Field of Classification Search ............ 713/300, 713/320, 323, 324; 455/574; 365/227
See application file for complete search history.

(56) References Cited

U.S. PATENT DOCUMENTS

| | | | |
|---|---|---|---|
| 6,904,533 B2 * | 6/2005 | Kuo et al. | 713/322 |
| 7,421,591 B2 * | 9/2008 | Sultenfuss et al. | 713/300 |
| 7,596,687 B2 * | 9/2009 | Sultenfuss et al. | 713/100 |
| 2009/0021450 A1 * | 1/2009 | Heller et al. | 345/1.3 |

* cited by examiner

*Primary Examiner* — Stefan Stoynov
(74) *Attorney, Agent, or Firm* — Kacvinsky Daisak, PLLC

(57) ABSTRACT

Various embodiments are directed to a tri-layered power scheme for architectures which contain a microcontroller. In one embodiment, a power management system may comprise a microcontroller in a chipset, a low consumption power well to control a power supply to the microcontroller, and a power controller to control a power supply to the low consumption power well. The power management system may be arranged to switch among multiple power consumption states. In a maximum power consumption state, the microcontroller is on, the power controller is on, and the low consumption power well is on. In an intermediate power consumption state, the microcontroller is off, the power controller is on, and the low consumption power well is required to be on. In a minimum power consumption state, the microcontroller is off, the power controller is on, and the low consumption power well is optionally on or off at the discretion of the power controller. Other embodiments are described and claimed.

20 Claims, 3 Drawing Sheets

200

```
┌─────────────────────────┐
│  CONTROL POWER SUPPLY   │
│     TO MC FROM LCPW     │
│           202           │
└───────────┬─────────────┘
            │
┌───────────▼─────────────┐
│  MAINTAIN POWER SUPPLY  │
│        TO LCPW          │
│           204           │
└───────────┬─────────────┘
            │
┌───────────▼─────────────┐
│   CONFIGURE LCPW WITH   │
│     MC WAKE EVENTS      │
│           206           │
└───────────┬─────────────┘
            │
┌───────────▼─────────────┐
│     POWER-DOWN MC       │
│           208           │
└───────────┬─────────────┘
            │
┌───────────▼─────────────┐
│   RECEIVE MC WAKE EVENT │
│        AT LCPW          │
│           210           │
└───────────┬─────────────┘
            │
┌───────────▼─────────────┐
│      POWER-UP MC        │
│           212           │
└─────────────────────────┘
```

FIG. 2

TRI-LAYERED POWER SCHEME FOR ARCHITECTURES WHICH CONTAIN A MICRO-CONTROLLER

BACKGROUND

A computing system may include a chipset and an embedded power controller (PC) arranged to implement power saving measures which power down various aspects of the chipset in certain situations. In some cases, unconditionally powering down the chipset may disrupt the intended functionality of the computing system.

BRIEF DESCRIPTION OF THE DRAWINGS

FIG. 2 illustrates one embodiment of a power management logic flow.

DETAILED DESCRIPTION

Figure 1:
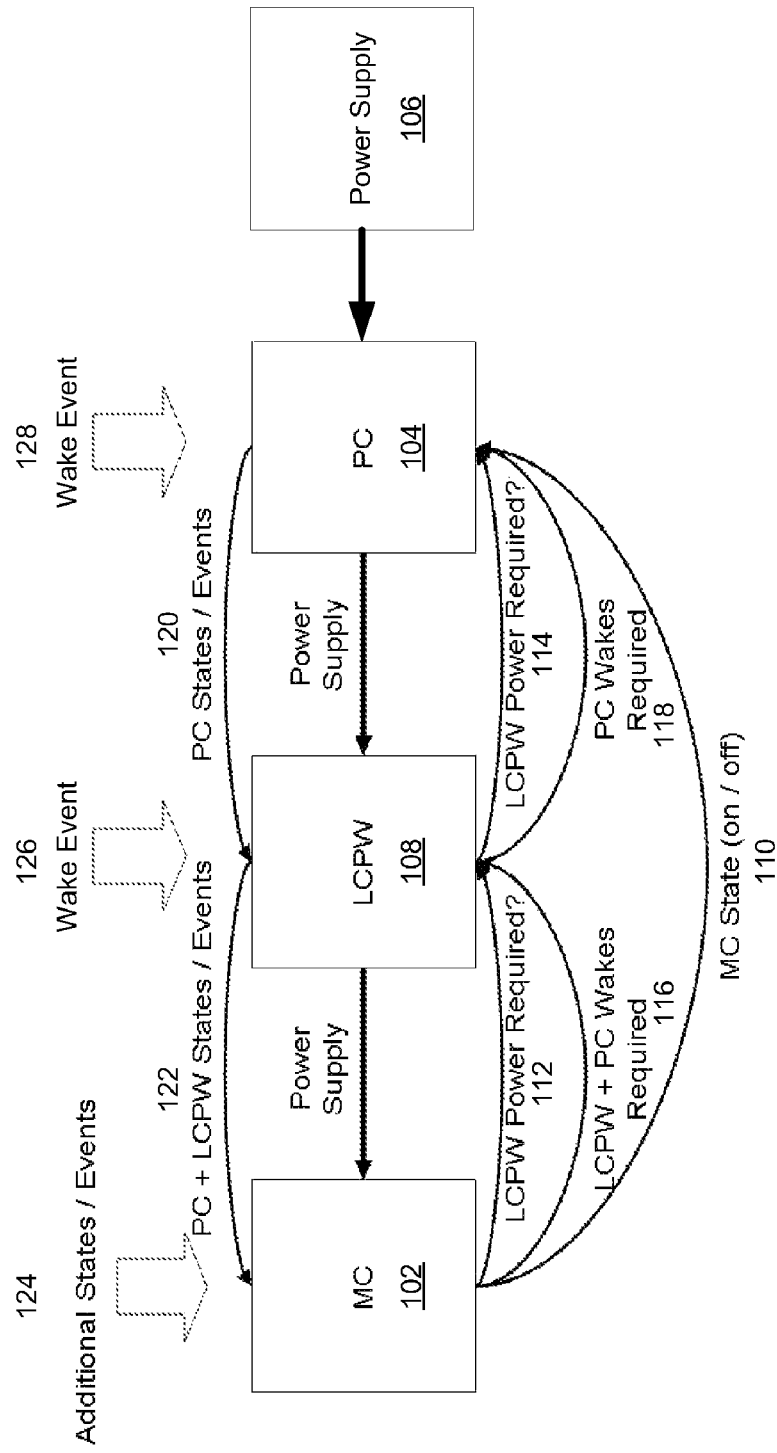
FIG. 1 illustrates one embodiment of a power management system.

FIG. 1 illustrates a power management system 100 in accordance with one or more embodiments. In general, the power management system 100 may comprise various physical and/or logical components for communicating information which may be implemented as hardware components (e.g., computing devices, processors, logic devices), executable computer program instructions (e.g., firmware, software) to be executed by various hardware components, or any combination thereof, as desired for a given set of design parameters or performance constraints. Although FIG. 1 may show a limited number of components by way of example, it can be appreciated that a greater or a fewer number of components may be employed for a given implementation.

In various embodiments, the power management system 100 may be implemented by a computing platform such as a mobile platform, personal computer (PC) platform, and/or consumer electronics (CE) platform supporting various networking, communications, and/or multimedia capabilities. Such capabilities may be supported by various networks, such as a Wide Area Network (WAN), Local Area Network (LAN), Metropolitan Area Network (MAN), wireless WAN (WWAN), wireless LAN (WLAN), wireless MAN (WMAN), wireless personal area network (WPAN), Worldwide Interoperability for Microwave Access (WiMAX) network, broadband wireless access (BWA) network, the Internet, the World Wide Web, telephone network, radio network, television network, cable network, satellite network such as a direct broadcast satellite (DBS) network, Code Division Multiple Access (CDMA) network, third generation (3G) network such as Wide-band CDMA (WCDMA), fourth generation (4G) network, Time Division Multiple Access (TDMA) network, Extended-TDMA (E-TDMA) cellular radiotelephone network, Global System for Mobile Communications (GSM) network, GSM with General Packet Radio Service (GPRS) systems (GSM/GPRS) network, Synchronous Division Multiple Access (SDMA) network, Time Division Synchronous CDMA (TD-SCDMA) network, Orthogonal Frequency Division Multiplexing (OFDM) network, Orthogonal Frequency Division Multiple Access (OFDMA) network, North American Digital Cellular (NADC) cellular radiotelephone network, Narrowband Advanced Mobile Phone Service (NAMPS) network, Universal Mobile Telephone System (UMTS) network, and/or any other wired or wireless network in accordance with the described embodiments.

In some implementations, the power management system 100 may comprise a system within and/or connected to a computing device such as PC, desktop PC, notebook PC, laptop computer, mobile computing device, smart phone, personal digital assistant (PDA), mobile telephone, combination mobile telephone/PDA, video device, television (TV) device, digital TV (DTV) device, high-definition TV (HDTV) device, media player device, gaming device, or other type of computing device in accordance with the described embodiments.

The computing device comprising the power management system 100 may form part of a wired communications system, a wireless communications system, or a combination of both. For example, the computing device may be arranged to communicate information over one or more types of wired communication links. Examples of a wired communication link, may include, without limitation, a wire, cable, bus, printed circuit board (PCB), Ethernet connection, peer-to-peer (P2P) connection, backplane, switch fabric, semiconductor material, twisted-pair wire, co-axial cable, fiber optic connection, and so forth. The computing device may be arranged to communicate information over one or more types of wireless communication links. Examples of a wireless communication link may include, without limitation, a radio channel, satellite channel, television channel, broadcast channel infrared channel, radio-frequency (RF) channel, Wireless Fidelity (WiFi) channel, a portion of the RF spectrum, and/or one or more licensed or license-free frequency bands. In wireless implementations, the mobile computing device may comprise one more interfaces and/or components for wireless communication such as one or more transmitters, receivers, transceivers, amplifiers, filters, control logic, wireless network interface cards (WNICs), antennas, and so forth. Although certain embodiments may be illustrated using a particular communications media by way of example, it may be appreciated that the principles and techniques discussed herein may be implemented using various communication media and accompanying technology.

As shown, the power management system 100 may comprise a microcontroller (MC) 102. In various embodiments, the MC 102 may comprise an embedded processing device on a chipset implemented by a computing platform and/or computing device.

The chipset may be mounted to a circuit board (e.g., motherboard, baseboard, system board, logic board, etc.) that comprises or supports various system components and features in addition to the chipset such as a central processing unit (CPU), a basic I/O system (BIOS), memory (e.g., volatile or non-volatile memory, removable or non-removable memory, erasable or non-erasable memory, writeable or re-writeable memory) such as double-data-rate two synchronous dynamic random access memory (DDR2) and flash memory, a network interface card (NIC) (e.g., Ethernet LAN adapter, WNIC), controllers such as an embedded controller (EC), system management controller (SMC), keyboard controller (KBC), and/or LAN controller, a clock such as a real-time clock (RTC), as well as other components and features in accordance with the described embodiments.

The circuit board also may comprise or support various interfaces and connectors such as video graphics array (VGA), low-voltage differential signaling (LVDS), TV-out (e.g., D-connector, S-Video, component video, composite video), serial digital video out (SDVO), peripheral component interconnect (PCI), PCI Express, on-board LAN, serial peripheral interface (SPI), Advanced Technology Attachment (ATA), Universal Serial Bus (USB), Low Pin Count (LPC), Infrared Data Association (IrDA), universal asynchronous receiver/transmitter (UART), system management bus (SM-Bus), and other interfaces and connectors in accordance with the described embodiments.

As shown, the power management system 100 may comprise a Power Controller (PC) 104 connected to a power supply 106 such as an Advanced Technology Extended (ATX) power supply, a battery pack, and/or an alternating current (AC) power supply. In various implementations, the PC 104 may be arranged to power down various aspects of the chipset comprising the MC 102, and the power supply 106 may be arranged to switch between AC and battery power. For example, the PC 104 may be arranged to implement power saving measures and gate power to the chipset when the power supply 106 switches from AC power to battery power. In various embodiments, the PC 104 and the chipset may support sleep (Sx) states including the S0—power on state, the S3—Standby or suspend to RAM state, the S4—hibernate or suspend-to-disk state, and the S5—soft off state in accordance with Advanced Configuration and Power Interface (ACPI) Specification, Revision 3.0b, published Oct. 10, 2006.

The PC 104 may be implemented by one or more controllers (e.g., microcontroller), hardware board connections, or any combination thereof, as desired for a given set of design parameters or performance constraints. In some embodiments, the PC 104 may be implemented as an EC comprising an original equipment manufacturer (OEM) component of company other than the manufacturer of the chipset. In some embodiments, the PC 104 may be implemented by a Power Management Controller (PMC) comprising a component supplied by the manufacturer of the chipset.

In general, the MC 102 may be arranged to perform various actions and features for the computing device. In some embodiments, the MC 102 may implement a Manageability Engine (ME) arranged to provide remote manageability features for the computing device. For example, in one embodiment, the MC 102 may implement a ME for a chipset comprising a Graphics and Memory Controller Hub (GMCH) northbridge and an Input/Output (I/O) Controller Hub (ICH) southbridge supporting Intel® Active Management Technology (AMT).

In various implementations, the MC 102 may support features even when the computing device is in a sleep, hibernate, or off state. For example, remote manageability features such as installation of software updates may be supported by the MC 102 even if the computing device is not switched on by waking the computing device via out-of-band communication, installing the necessary updates, and returning the computing device back to the sleep state. Other remote manageability features may include diagnosing various computer problems and taking automated hardware and software inventories. Although certain embodiments may be described in the context of remote manageability features by way of example, it may be appreciated that the principles and techniques discussed herein may be implemented for various types of features supported by the MC 102 when the computing device is in a sleep, hibernate, or off state.

As shown, the power management system 100 may comprise a Lower Consumption Power Well (LCPW) 108. In general, the LCPW 108 may be arranged to consume less power than the MC 102 and to control power to MC 102. The PC 104 may be arranged to consume less power than the LCPW 108 and control the supply of power to the LCPW 108. For example, the LCPW 108 may comprise a suspend well that receives power gated by the PC 104 in conjunction with power saving measures or Sx states such as standby, hibernate, off, and/or others in accordance with the described embodiments. In some embodiments, the LCPW 108 may be implemented by hardware logic in the chipset comprising the MC 102. In some embodiments, the LCPW 108 may be implemented by a processing component running firmware.

In some implementations, the LCPW 108 may be arranged to control power to MC 102 as well as to an associated power well. For example, the LCPW 108 may control power to other devices on the chipset along with the MC 102. In such implementations, the LCPW 108 may be arranged to consume less power than the MC 102 and the associated power well.

In various embodiments, the power management system 100 may be arranged to support multiple power consumption states including a first power consumption state (Power State 1), a second power consumption state (Power State 2), and a third power consumption state (Power State 3). When the power management system 100 is in Power State 1, the MC 102 is on, the PC 104 is on, and the LCPW 108 is on. When the power management system 100 is in Power State 2, the MC 102 is off, the PC 104 is on, and the LCPW 108 is required to be on. When the power management system 100 is in Power State 3, the MC 102 is off, the PC 104 is on, and the LCPW 108 is optionally on or off at the discretion of the PC 104.

The power management system 100 may be arranged to switch among the multiple power consumption states in accordance with power saving measures while ensuring that the MC 102 can support certain features (e.g., remote manageability) even when the computing platform and/or device is in a power saving state.

In various embodiments, the MC 102 microcontroller may be arranged to configure the LCPW 108 and/or the PC 104 with one or more MC events wake events before powering down so that the LCPW 108 and/or PC 104 may support wake events even when the power of the MC 102 is off. In some implementations, the MC 102 microcontroller may be arranged to configure the PC 104 with one or more LCPW wake events to power-up the LCPW 108 in cases where the PC 104 decides to turn off the LCPW 108. In such implementations, the MC 102 may configure the power-up of the LCPW 108 as an MC wake event. Other exemplary wake events may include, without limitation, an incoming communication such as LAN packet arrival or incoming voice or data call, a user initiated wake such as pushing a button or key, a periodic wake event according to a certain time interval or time expiration, and/or any other predefined or dynamic wake event in accordance with the described embodiments.

The power management system 100 may support various communication mechanisms among the MC 102, the PC 104, and/or the LCPW 108 for communicating messages to configure components of the power management system 100 and to switch among the multiple power consumption states. The communications mechanisms supported by the power management system 100 may be implemented, for example, by a bus interface, pin-based interface, or any other type of communications mechanism in accordance with the described embodiments. It may be appreciated that the communications mechanisms may be hard-wired in device specifications as a set of pre-defined wake events instead or in addition to dynamic wake events.

The power management system 100 may support a communication mechanism from the MC 102 to the PC 104 for various messages indicating the state (on/off) of the MC 102 to the PC 104. For example, the MC 102 may communicate an MC state message 110 indicating the on/off state of the MC 102 to the PC 104.

The power management system 100 may support a communication mechanism from the MC 102 to the LCPW 108 and the PC 104 for various messages indicating the need to maintain power to the LCPW 108. For example, the MC 102 may communicate an LCPW Power Required message 112 to the LCPW 108, and the LCPW 108 may communicate an LCPW Power Required message 114 to the PC 104 indicating that the PC 104 is required to maintain power to the LCPW 108. In general, the power-backing of this communication mechanism must arrive from the LCPW 108 so that state is not lost if the MC 102 gets powered-down and may be hard-wired in device specifications in some embodiments.

The power management system 100 may support a communication mechanism from the MC 102 to the LCPW 108 and the PC 104 for various messages indicating if there are any required wake events for the MC 102 whose source is the LCPW 108 or the PC 104. For example, the MC 102 may communicate an LCPW+PC Wakes Required message 116 to the LCPW 108, and the LCPW 108 may communicate a PC wakes required message 118 to the PC 104 to configure various wake events. In general, the MC 102 may configure the LCPW 108 to power-up the MC 102 in response to certain wake events received by the LCPW 108 or the PC 104. In various embodiments, one of these wake events must be caused by power-up of the LCPW 108.

The power management system 100 may support a communication mechanism from the MC 102 to the LCPW 108 and the PC 104 for various messages indicating that there are any required wakes to the LCPW 108. For example, the LCPW 108 may be off at times when the communications system 100 is in Power State 3. The MC 102 may configure the PC 104 to power-up the LCPW 108 in response to certain wake events received by the PC 104 which then will cause the LCPW 108 to power-up the MC 102. In general, the power-backing of this communication mechanism must arrive from the PC 104 so that state is not lost if the LCPW 108 gets powered-down and may be hard-wired in device specifications in some embodiments.

The power management system 100 may support a communication mechanism to the MC 102 from the PC 104 and/or the LCPW 108 for various messages indicating a relevant state or event by which the MC 102 may decide to change its power state or by which the LCPW 108 may wake the MC 102, if configured by the MC 102 to do so. For example, the PC 104 may communicate a PC states and events message 120 to the LCPW 108, and the LCPW 108 may communicate a PC+LCPW states and events message 122 to the MC 102 for allowing the MC 102 to decide whether to change its state.

The power management system 100 also may support one or more communication mechanisms to the MC 102 from other platform components for various messages indicating a relevant state or event by which the MC 102 may decide to change its power state. For example, the MC 102 may receive additional states and events 124 from other platform components for allowing the MC 102 to decide whether to change its state.

In general, the LCPW 108 cannot force the MC 102 to power-down, and the decision by the MC 102 to power-down may depend on various LCPW and/or PC state and/or events as well as on additional states and/or events of the system. In addition, for any required MC power-cycle, the MC 102 must first communicate to PC 104 to maintain power to the LCPW 108 so that the PC 104 will not cut off power to the LCPW 108 in the middle of the MC power-cycle thus cutting the cycle.

Power State 1 is the maximum power consumption level when the MC 102, the PC 104, and the LCPW 108 are all on and fully operational. When the communication system 100 is in Power State 1, the MC 102 may indicate to the PC 104 that it is on and that the PC 104 is required to maintain power to the LCPW 108.

In Power State 1, the LCPW 108 may be arranged to interface with the MC 102 and the PC 104 to prevent the unconditional powering down of the MC 102 even when the PC 104 implements power saving measures. As mentioned, the MC 102 may form part of a chipset that is powered down under the control of the PC 104. It can be appreciated that requiring the LCPW 108 to be powered ensures a power supply for the MC 102 and prevents the PC 104 from unconditionally powering down the MC 102 along with other aspects of the chipset.

Power State 2 is an intermediate power consumption level when the MC 102 is off, but the PC 104 and the LCPW 108 are on and operational. When the power management system 100 is in this intermediate power consumption level, power is saved while allowing the MC 102 to power-up in response to various wake events. Although the MC 102 is off in Power State 2, the LCPW 108 is on and controls the supply of power to the MC 102 to power-up the MC 102 in response to wake events.

For a transition from Power State 1 to Power State 2, the MC 102 may indicate a state change to the PC 104 and also may indicate to the LCPW 108 and the PC 104 that the PC 104 must maintain power to the LCPW 108. Prior to powering down, the MC 102 may require the LCPW 108 to remain powered by the PC 104 so that the LCPW 108 may support wake events even when the MC 102 is off. The MC 102 may configure one or more wake events for the LCPW 108 and/or the PC 104 and then perform the transition from Power State 1 to Power State 2 to power-down the MC 102.

In Power State 2, the LCPW 108 may support the wake capability of the MC 102. The MC 102 may configure one or more wake events for the LCPW 108 that if detected or received by the LCPW 108 result in power-up of the MC 102 by the LCPW 108. In Power State 2, the PC 104 also may support the wake capability of the MC 102. The MC 102 may configure one or more wake events for the PC 104 that if detected or received by the PC 104 result in power-up of the MC 102 by the LCPW 108.

For a transition from Power State 2 to Power State 1, the PC 104 and/or the LCPW 108 may receive a wake event in accordance with the wake events previously configured by the MC 102. In response, the LCPW 108 may control the power supply to turn the MC 102 from off to on. As shown, the LCPW 108 may receive a wake event 126.

If the wake event 126 was previously configured by the MC 102, the LCPW 108 will power-up the MC 102. As shown, the PC 104 may receive a wake event 128. If the wake event 128 was previously configured by the MC 102, the LCPW 108 will power-up the MC 102. In some cases, a PC may decide on its own accord to send a message to wake up the MC 102 in which case the message must be received by a portion of the LCPW 108. In some cases, a component internal to the LCPW 108 may decide to send a message to wake up the MC 102.

Power State 3 is the minimum power consumption level when the MC 102 is off, the PC 104 is on, and the LCPW 108 is optionally on or off. When the power management system 100 is in this minimum power consumption level, power is saved while still allowing the MC 102 to power-up in response to various wake events. Although the MC 102 is off and the LCPW 108 may be off in Power State 3, the PC 104 is on and controls the supply of power to the LCPW 108. In response to a wake event configure by the MC 102, the PC 104 will power-up the LCPW 108 resulting in power-up of the MC 102 by the LCPW 108.

For a transition from Power State 1 to Power State 3, the MC 102 may indicate a state change to the PC 104 and also may indicate that the PC 104 may power-down the LCPW 108. The MC 102 may configure one or more wake events for the PC 104 and may configure one or more wake events for the LCPW 108 in cases where the PC 104 decides to maintain power to the LCPW 108. In cases where the PC 104 might decide to power-off the LCPW 108, the MC 102 may configure one or more wake events for the PC 104 as an LCPW power-up event and may configure the LCPW event for the LCPW 108 as a wake event to power-up the MC 102. After performing the necessary configurations, the MC 102 may transition from Power State 1 to Power State 3 and power-down the MC 102. In cases where the PC 104 decides to power-off the LCPW 108, the PC 104 may power-down the LCPW 108 at the same time as the MC 102 or afterwards.

When the power management system 100 is in Power State 3 and the LCPW 108 is on, the LCPW 108 and the PC 104 may support the wake capability of the MC 102 as described for Power State 2. When the power management system 100 is in Power State 3 and the LCPW 108 is off, the PC 104 may support the wake capability of the MC 102. The MC 102 may configure one or more wake events for the PC 104 that if detected or received by the PC 104 result in the power-up of the LCPW 108 by the PC 104 which then causes the LCPW 108 to power-up the MC 102.

For a transition from Power State 3 to Power State 1 in cases where the PC 104 decides to maintain power to the LCPW 108, the PC 104 and/or the LCPW 108 may receive a wake event in accordance with the wake events previously configured by the MC 102, and the LCPW 108 may power-up the MC 102.

For a transition from Power State 3 to Power State 1 in cases where the PC 104 decides to power-down to the LCPW 108, the PC 104 may receive a wake event in accordance with the wake events previously configured by the MC 102. In response, the PC 104 may control the power supply to turn the LCPW 108 from off to on, and the LCPW 108 subsequently may power-up the MC 102. The power-up of the MC 102 by the LCPW 108 may be based on a previous configuration by the MC 102 that an LCPW power-up event causes an MC wake event. For example, the MC 102 may configure the LCPW 108 to detect its power-up event as a wake event for the MC 102 causing the LCPW 108 to power-up the MC 102. For such cases, the PC 104 may need to allow some timeout before checking the MC-dictated logic about powering-down the LCPW 108 again as the MC 102 may require time to become initialized.

FIG. 2 illustrates a power management logic flow 200 in accordance with one or more embodiments. The logic flow 200 may be performed by various systems and/or devices and may be implemented by one or more logic devices (e.g., processor, hardware components) and/or logic comprising executable computer program instructions (e.g., firmware, software) to be executed by a logic device.

The logic flow 200 may comprise controlling a power supply to a MC from a LCPW (block 202), communicating an indication from the MC to a PC to maintain a power supply to the LCPW (block 204), configuring the LCPW with one or more MC wake events (block 206), powering down the MC (block 208), receiving a MC wake event at the LCPW (block 210), and controlling the power supply to the MC from the LCPW to power-up the MC (block 212). It can be appreciated that the logic flow 200 may comprise various other steps in accordance with the described embodiments.

Figure 3:
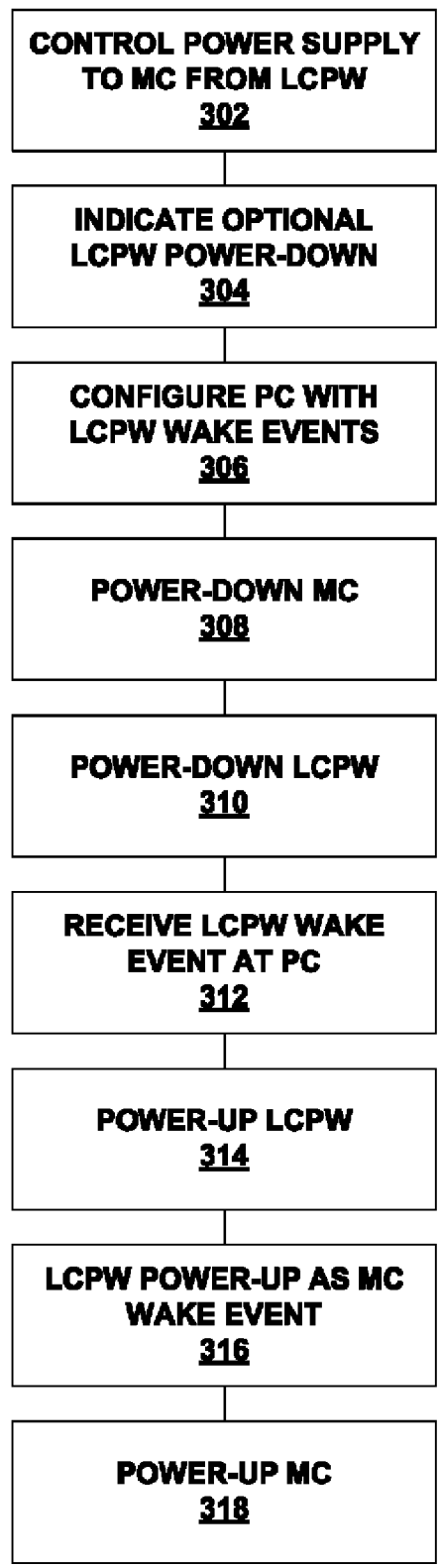
FIG. 3 illustrates one embodiment of a power management logic flow.

FIG. 3 illustrates a power management logic flow 300 in accordance with one or more embodiments. The logic flow 300 may be performed by various systems and/or devices and may be implemented by one or more logic devices (e.g., processor, hardware components) and/or logic comprising executable computer program instructions (e.g., firmware, software) to be executed by a logic device.

The logic flow 300 may comprise controlling a power supply to a MC from a LCPW (block 302), communicating an indication from the MC to a PC that the PC may optionally power-down the LCPW (block 304), configuring the PC with one or more LCPW wake events (block 306), powering down the MC (block 308), powering down the LCPW (block 310), receiving a LCPW wake event at the PC (block 312), controlling a power supply to the LCPW to power-up the LCPW (block 314), interpreting the power-up of the LCPW as a MC wake event (block 316), and controlling a power supply to the MC from the LCPW to power-up the MC (block 318). It can be appreciated that the logic flow 300 may include various other steps in accordance with the described embodiments.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Although some embodiments may be illustrated and described as comprising exemplary functional components or modules performing various operations, it can be appreciated that such components or modules may be implemented by one or more hardware components, software components, and/or combination thereof.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated.

In various embodiments, the logic flow may comprise, or be implemented as, executable computer program instructions. The executable computer program instructions may be implemented by firmware, software, a module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computing device to perform a certain function. The executable computer program instructions may be implemented using any suitable programming language in accordance with the described embodiments.

In various embodiments, logic flow may comprise, or be implemented as, executable computer program instructions stored in an article of manufacture and/or computer-readable storage medium implemented by various systems and/or devices in accordance with the described embodiments. The article and/or computer-readable storage medium may store executable computer program instructions that, when executed by a computing device, cause the computing device to perform methods and/or operations in accordance with the described embodiments.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable media in accordance with the described embodiments.

Unless specifically stated otherwise, it may be appreciated that terms such as "processing," "computing," "calculating," "determining," "deciding," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a power management system comprising:
a microcontroller in a chipset;
a low consumption power well to control a power supply to the microcontroller; and
a power controller to control a power supply to the low consumption power well,
the power management system to switch among multiple power consumption states including:
a maximum power consumption state wherein the microcontroller is on, the power controller is on, and the low consumption power well is on;
an intermediate power consumption state wherein the microcontroller is off, the power controller is on, and the low consumption power well is required to be on; and
a minimum power consumption state wherein the microcontroller is off, the power controller is on, and the low consumption power well is optionally on or off at the discretion of the power controller.

2. The apparatus of claim 1, the microcontroller to configure the low consumption power well with one or more microcontroller wake events before transitioning to the intermediate power consumption state or the minimum power consumption state.

3. The apparatus of claim 2, the low consumption power well to control the power supply to the microcontroller to power-up the microcontroller in response to receiving a microcontroller wake event.

4. The apparatus of claim 1, the microcontroller to configure the power controller with one or more microcontroller wake events before transitioning to the intermediate power consumption state or the minimum power consumption state.

5. The apparatus of claim 4, the low consumption power well to control the power supply to the microcontroller to power-up the microcontroller in response to the power controller receiving a microcontroller wake event.

6. The apparatus of claim 1, the microcontroller to configure the power controller with one or more low consumption power well wake events before transitioning to the minimum power consumption state.

7. The apparatus of claim 6, the power controller to control the power supply to the low consumption power well to power-up the low consumption power well in response the power controller receiving a low consumption power well wake event.

8. The apparatus of claim 7, the low consumption power well to control the power supply to the microcontroller to power-up the microcontroller.

9. The apparatus of claim 7, the microcontroller to configure power-up of the low consumption power well as a microcontroller wake event.

10. The apparatus of claim 1, the microcontroller comprising a manageability engine.

11. The apparatus of claim 1, the power controller comprising an original equipment manufacturer (OEM) component.

12. The apparatus of claim 1, the low consumption power well comprising a power well forming part of the chipset.

13. The apparatus of claim 1, the power management system implemented by at least one of a mobile computing platform and a desktop computing platform.

14. A method comprising:
controlling a power supply to a microcontroller from a low consumption power well;
communicating an indication from the microcontroller to a power controller to maintain a power supply to the low consumption power well;
configuring the low consumption power well with one or more microcontroller wake events;
powering down the microcontroller;

receiving a microcontroller wake event at the low consumption power well; and controlling the power supply to the microcontroller from the low consumption power well to power-up the microcontroller.

15. The method of claim 14, further comprising configuring the power controller with one or more microcontroller wake events.

16. The method of claim 15, further comprising receiving a microcontroller wake event at the power controller.

17. A method comprising:

controlling a power supply to a microcontroller from a low consumption power well;

communicating an indication from the microcontroller to a power controller that the power controller may optionally power-down the low consumption power well;

configuring the power controller with one or more low consumption power well wake events;

powering down the microcontroller;

receiving a low consumption power well wake event at the power controller;

controlling a power supply to the microcontroller from the low consumption power well to power-up the microcontroller.

18. The method of claim 17, further comprising powering down the low consumption power well.

19. The method of claim 18, further comprising:

controlling a power supply to the low consumption power well to power-up the low consumption power well in response to the low consumption power well wake event; and interpreting the power-up of the low consumption power well as a microcontroller wake event.

20. The method of claim 17, further comprising configuring the low consumption power well with one or more microcontroller wake events.

* * * * *